US009405344B1

(12) United States Patent
Rosen (10) Patent No.: US 9,405,344 B1
(45) Date of Patent: *Aug. 2, 2016

(54) METHOD AND APPARATUS FOR ACTIVATING SLEEP MODE (71) Applicant: Marvell Israel (M.I.S.L) Ltd., Yokneam (IL)

(72) Inventor: Eitan Rosen, Abirim, IL (US)

(73) Assignee: MARVELL ISRAEL (M.I.S.L.) LTD., Yokneam (IL)

(*) Notice: Subject to any disclaimer, the term of this patent is extended or adjusted under 35 U.S.C. 154(b) by 0 days.

This patent is subject to a terminal disclaimer.

(21) Appl. No.: 13/867,698

(22) Filed: Apr. 22, 2013

Related U.S. Application Data

(63) Continuation of application No. 12/115,224, filed on May 5, 2008, now Pat. No. 8,448,003.

(60) Provisional application No. 60/915,766, filed on May 3, 2007.

(51) Int. Cl.
*G06F 1/32* (2006.01)

(52) U.S. Cl.
CPC .................................... *G06F 1/3206* (2013.01)

(58) Field of Classification Search
CPC .................................................. G06F 1/3206
USPC ......................................... 713/320, 323, 322
See application file for complete search history.

(56) References Cited

U.S. PATENT DOCUMENTS

| 5,060,243 | A | | 10/1991 | Eckert |
| 5,585,745 | A | | 12/1996 | Simmons et al. |
| 5,887,179 | A | * | 3/1999 | Halahmi et al. ............... 713/324 |
| 5,925,133 | A | | 7/1999 | Buxton et al. |
| 6,097,243 | A | | 8/2000 | Bertin et al. |
| 6,307,281 | B1 | * | 10/2001 | Houston .......................... 307/31 |
| 6,785,826 | B1 | * | 8/2004 | Durham et al. ................ 713/300 |
| 6,853,698 | B1 | | 2/2005 | Nguyen |
| 6,983,389 | B1 | | 1/2006 | Filippo |
| 7,120,911 | B1 | | 10/2006 | Katayama |
| 7,134,028 | B2 | * | 11/2006 | Bose et al. ..................... 713/300 |
| 7,178,044 | B2 | | 2/2007 | Pappalardo et al. |
| 7,383,457 | B1 | * | 6/2008 | Knight ........................... 713/323 |
| 7,696,641 | B2 | | 4/2010 | Tomita |
| 7,802,116 | B2 | * | 9/2010 | Ravichandran ................ 713/320 |
| 7,853,811 | B1 | | 12/2010 | Walstrum et al. |
| 8,448,003 | B1 | * | 5/2013 | Rosen ............................ 713/323 |
| 2002/0053039 | A1 | * | 5/2002 | Inoue et al. ..................... 713/323 |
| 2002/0184547 | A1 | * | 12/2002 | Francis et al. ................. 713/322 |
| 2004/0117679 | A1 | | 6/2004 | Kim |
| 2004/0148533 | A1 | * | 7/2004 | Nicholas ......................... 713/320 |
| 2005/0055592 | A1 | * | 3/2005 | Velasco et al. ................. 713/322 |
| 2007/0085583 | A1 | | 4/2007 | Zohar |
| 2007/0113113 | A1 | | 5/2007 | Sauer et al. |
| 2007/0162775 | A1 | * | 7/2007 | Raghuvanshi ................. 713/320 |
| 2007/0236850 | A1 | | 10/2007 | Kuhn et al. |
| 2008/0229130 | A1 | | 9/2008 | Guan et al. |

* cited by examiner

*Primary Examiner* — Vincent Tran (57) ABSTRACT

An integrated circuit includes a circuit including a plurality of functional blocks, a sensor associated with one of the plurality of functional blocks for sensing a state of activity thereof, and a sleep switch receiving an output from the sensor and placing the associated functional block in a sleep state in response to the sensed state of activity.

21 Claims, 7 Drawing Sheets

METHOD AND APPARATUS FOR ACTIVATING SLEEP MODE

CROSS REFERENCE TO PRIOR APPLICATIONS

This application is a continuation of U.S. patent application Ser. No. 12/115,224, filed on May 5, 2008, which is hereby incorporated by reference for all purposes as if fully set forth herein. This application claims priority and the benefit thereof from a U.S. Provisional Application No. 60/915,766 filed on May 3, 2007, which is hereby incorporated by reference for all purposes as if fully set forth herein.

BACKGROUND

1. Field of the Disclosure

This disclosure relates to reducing power usage in mobile electronic devices, and more particularly to performing more precise and efficient power saving operations in mobile electronic devices.

2. Related Art

Power consumption management is a concern in many electronic devices. Circuits that remain active, although not presently needed, may increase power consumption and/or raise an operating temperature which could have adverse affects. Moreover, many mobile electronic devices operate on batteries or other limited power sources. Some mobile electronic devices are configured to operate during periods of reduced activity in an idle mode to reduce power consumption and to extend battery life.

Conventionally, power consumption is managed at an operating system end of the electronic device, which may periodically deactivate some components to reduce the power consumption. Reliance on the operating system to govern entry of a device, or its components, into an idle mode may be less than optimal for some circuits.

SUMMARY

In one aspect of the disclosure, an integrated circuit includes a circuit including plurality of functional blocks, a sensor associated with one of the plurality of functional blocks for sensing a state of activity thereof, and a sleep switch receiving an output from the sensor and placing the associated functional block in a sleep state in response to the sensed state of activity.

According to another aspect of the disclosure, a logic device includes a logic block, a controller configured to generate an enable signal for activating the logic block, and a sleep activation circuit responsive to an activity or an inactivity state of the logic block and configured to cause the logic block to enter a sleep mode following a predetermined period of time after the enable signal is de-asserted.

In yet another aspect of the disclosure, a method of controlling a sleep mode in a functional block of a circuit includes counting clock cycles, monitoring whether the functional block is active, and causing the functional block to enter a sleep mode when the functional block has been inactive for a predetermined number of clock cycles.

In yet another aspect of the disclosure, a logic device includes a logic block, a controller configured to generate an enable signal for activating the logic block, and a sleep activation circuit responsive to the enable signal and configured to cause the logic block to enter a sleep mode following a predetermined period of time after the enable signal is de-asserted.

In yet another aspect of the disclosure, a method of controlling a sleep mode in a functional block of a circuit includes counting clock cycles, monitoring an activity state of the functional block, and causing the functional block to enter a sleep mode following a predetermined number of clock cycles during which the functional block is not active.

Additional features, advantages, and embodiments of the disclosure may be set forth or apparent from consideration of the following detailed description, drawings, and claims. Moreover, it is to be understood that both the foregoing summary of the disclosure and the following detailed description are mere examples and intended to provide further explanation without limiting the scope of the disclosure as claimed.

BRIEF DESCRIPTION OF THE DRAWINGS

The accompanying drawings illustrate embodiments of the disclosure, and together with the detailed description serve to explain teaching principles of the disclosure. No attempt is made to show structural details of the disclosure in any more detail than may be necessary to understand teaching principles and elucidate examples of various ways in which it may be practiced. In the drawings.

DETAILED DESCRIPTION

The embodiments of the disclosure and various features thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments. Descriptions of well-known components and processing techniques may be omitted so as to not unnecessarily obscure teaching principles of embodiments described herein. The examples used herein are intended merely to facilitate an understanding of ways in which embodiments of the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

Mobile electronic devices, for example, mobile communication devices, mobile gaming devices, mobile computers, car stereos, personal GPS systems, portable TV/DVD combos MP3 players, and the like, typically use batteries, or the like, as a power source. Thus, it is important to reduce power consumption to enjoy an extended battery life. For example, in order to reduce power consumption, cellular phones often operate in an idle mode when they are open for receiving calls but are not transmitting or receiving data. In the idle mode, cellular phones deactivate some or most of their components to conserve battery power although the cellular phones may periodically, for example, once every two seconds, activate some of the components, for a short wake up period during the idle mode.

While the power consumption issue is a primary concern for battery powered devices, operating temperature is a common concern for both battery powered and non-battery powered electronic devices. Generally speaking, electronic circuits generate heat when they are active. Thus, adequate power consumption control may be beneficial to avoid overheating, which may cause structural damage, performance loss and the like. Also, suitable power consumption control may reduce or even eliminate a need for a cooling system, which very often increases the device size, manufacturing costs and so on.

One approach to reducing power consumption is simply to turn off some of the components when an electronic device is not in use. For example, cellular phones typically are configured to enter into and stay in an idle state when there is no activity, such as, for example taking an incoming call, message download, taking pictures and the like. During the idle state, a main processor running an operating system (OS) may instruct some of the components, such as a screen, to enter a sleep mode. When there is an activity (e.g., incoming call), the main processor may awaken selected components from sleep mode and instruct the components to execute operations related to the activity. However, this simple component level on/off approach may not fully address the power consumption and overheating issue since various functional blocks of an integrated circuit or processor may remain activated even though they may not be presently needed.

Conventionally, electronic devices rely on their operating systems (OS) to perform power saving operations by powering down not needed components, such as a screen, for example. However, while electronic devices may be configured with multiple components, the OS may provide instructions for executing power saving operations without knowing what kind of functional blocks, such as cache memory, adders, multipliers and the like functional blocks, are included in the electronic device, and, hence, may not be capable of communicating with and/or turning on and off the functional blocks individually. As the result, certain functional blocks may stay on when they could to be turned off, thereby causing unnecessary power consumption and/or heating. Thus when relying on the OS to perform power saving operations, it may be difficult to perform precise and efficient power consumption control in the electronic devices.

In accordance with an embodiment of the disclosure, a sleep activation circuit (SAC) may be provided for some or all functional blocks of an electronic device. The SAC may serve as a low power state machine and may be feasible when the power consumption of the SAC is less than the amount of power that would have been used by the functional block had it not been deactivated by the SAC, taking into account the power requirements for deactivating a functional block. In this regard, the power consumption of the SAC itself must be minimized; otherwise, its use may exceed potential power savings. To minimize the power consumption, for example, in a microchip, the SAC may be implemented as a gate level logic, which may consume less than about 100 µW, for example.

In an embodiment, the SAC may be configured to delay functional blocks from being turned off for a certain period of time to avoid latency and power consumption due to unnecessary toggling into and out of a sleep state. The period of time may be determined by various factors, such as, for example, power consumption and leakage current of the functional block, power consumption of the SAC and the like. Circuitry that may be suitable for optimizing turning on and off functional blocks using SACs is described in greater detail in Applicant's provisional patent application 60/939,196, filed May 21, 2007, the disclosure of which is incorporated by reference in its entirety. More specifically, the period of time may be statistically optimized based on leakage currents of the component in a normal operation and in a sleep mode, power consumption of the component to enter the sleep mode, power consumption to operate the SAC, and the like.

In an embodiment, a SAC configuration number, i.e., a number of clock cycles for which a functional block is delayed from being turned off, may be obtained by observing power consumption using one or more numbers of clock cycles. For example, using a number of clock cycles that is large enough not to degrade the performance of the functional block yet small enough to reduce power consumption. In some circumstances, no change may be observed when changing the configuration numbers, which may be an indication that the SAC may not have an impact on power savings. For example, a SAC may show no impact on power savings when a functional block is rarely activated or almost always activated, and hence, never enters the sleep mode, or the functional block is so small such that its leakage or activation current is negligible. In other circumstances, an impact on the power savings may be observed by repeating the experiment for all predicted applications, for various silicon types (fast/slow) and operating conditions. For example, the SAC may determine whether the corresponding component may stay on or off for every 100 clock cycles if the 100 clock cycles is an optimum period to determine whether the component should stay turned on or off. The optimum period may vary depending on the components, and certain components may have shorter or longer optimum periods than others.

In accordance with an embodiment of the disclosure, the SAC may be implemented as a hardware circuit in an electronic device. In an embodiment, the SAC may be coupled to a functional block or a functional region of a device, such as, e.g., an integrated circuit, a processor, a controller or the like, and be configured to control each functional block individually for more precise and efficient power consumption control of the device. For low leakage chips, a SAC may be configured, for example, with a large configuration number to minimize performance degradation due to wake-up latency. The large configuration number may also minimize power consumption caused by entering into and waking up from the sleep state. High leakage parts, e.g., high speed silicon circuits operating at high voltage and in a hot environment, may be configured with a small configuration number. This may cause slight performance degradation but may have a significant impact on power savings. That, in turn, may reduce the heat generated in the part, reduce leakage of the non-sleeping blocks (i.e., leakage is very temperature sensitive) and allow the part to run at higher clock rates, thereby improving overall performance, not only power consumption.

Figure 1:
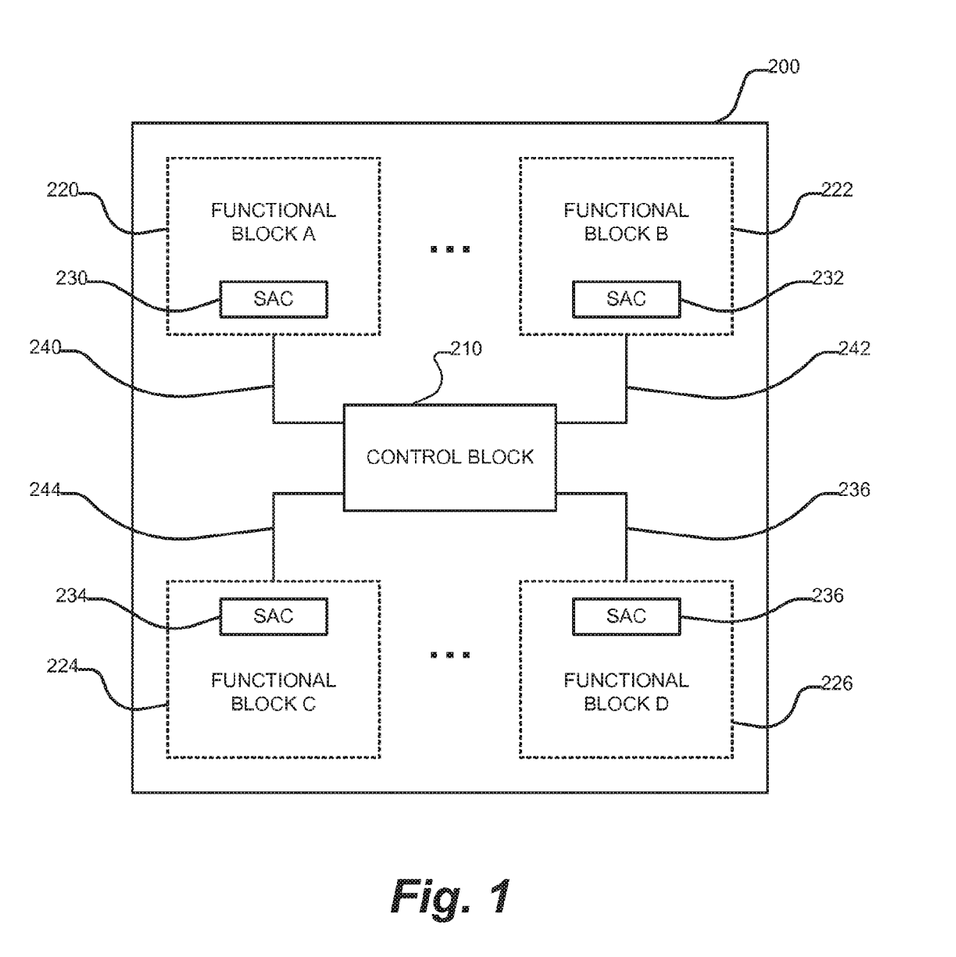
FIG. 1 shows an example of an electronic device configured with sleep activation circuits (SACs), in accordance with an embodiment of the disclosure.

FIG. 1 shows an example of an electronic device 200 employing sleep activation circuits (SACs) in accordance with an embodiment of the disclosure. The electronic device 200 may be any type of system, a component or module of a system, a module of a component, a component of a module, a microchip of a module or component, a logic block of a microchip, and the like. However, it is noted that the electronic device 200 may be any type of suitable electronic device and that it may include any number of components or functional blocks. For example, the electronic device 200 may be a microchip (e.g. a microprocessor, a memory chip or the like), a mobile communication device (e.g., a cellular phone, a personal data assistant (PDA) or the like), a mobile gaming device (e.g., Sony™ PlayStation Portable™), a personal computer (PC) (e.g., a desktop, a laptop, a portable computer or the like), a computer network (e.g., a home network, a business network, an Internet component or the like), a home appliance (e.g., a telephone, a television, an audio system, a set-top box, a camera, a camcorder and the like), a security system, broadcasting equipment, or the like.

In an embodiment, the electronic device 200 may include a control block 210, a plurality of functional blocks 220, 222, 224, 226, a plurality of SACs 230, 232, 234, 236 and a plurality of signal lines 240, 242, 244, 246. The control block 210 may be coupled to and configured to control the functional blocks 220, 222, 224, 226. For example, the control block 210 may generate controls signals to the functional blocks 220, 222, 224, 226 via the signal lines 240, 242, 244, 246. Each of the functional blocks 220, 222, 224, 226 may be any of a component or module of an electronic device, a module of a component, a component of a module, a microchip of a module or a component, a logic block of a microchip, a sub-block of a functional block of a microchip and the like for example, without limitation thereto, a cache memory, an adder circuit, a subtraction circuit, a multiplier or any other circuit or block including a plurality of circuits. It is noted that the functional blocks 220, 222, 224, 226 may comprise any conceivable electronic circuit that may be turned on and off and, hence, benefit from the hardware-based power saving scheme constructed according to the teaching principles of the disclosure. For example, the functional block may be one of the micro-blocks in a micro-circuitry, one of the logic blocks in a microchip, one of the memory blocks in a memory device, a microchip of a cellular phone or the like.

In an embodiment, the SACs 230, 232, 234, 236 may be provided to the functional blocks 220, 222, 224, 226 on a "one-on-one" basis to individually control the functional blocks 220, 222, 224, 226. For example, in FIG. 2, the SACs 230, 232, 234, 236 may be provided for the functional blocks 220, 222, 224, 226, respectively. The SAC 230, 232, 234, 236 may be physically located within the functional blocks 220, 222, 224, 226, respectively, as shown in FIG. 1. For example, in the case where the electronic device 200 is a microchip and the functional block 220 is a logic block, the SAC 230 may be implemented as a gate level logic within the functional block 220. However, the SACs 230, 232, 234, 236 may not be physically confined within the functional blocks 220, 222, 224, 226, respectively. For example, when the functional blocks 220, 222, 224, 226 are microchips mounted on a printed circuit board (PCB), each of the SACS 230, 232, 234, 236 may be incorporated in the control block 210, which may be a control module or a controller chip.

Referring back to FIG. 1, the SACs 230, 232, 234, 236 may be configured to monitor control signals from the control block 210 to the functional blocks 220, 222, 224, 226 or other suitable signals indicative of activity in a functional block. The control signal may be, for example, an enable signal, which may be issued to instruct the corresponding functional block to be ready to perform an operation, or a logical operational conditional. The enable signal may be issued a number of clock cycles before the control block 210 issues other signals related to the operation. Thus, when the enable signal is asserted, the SACs 230, 232, 234, 236 may not interrupt the operation to avoid any performance loss. In an embodiment, the SACs 230, 232, 234, 236 may be configured to relay the enable signal to the functional blocks 220, 222, 224, 226 with little or no delay. Alternatively, the electronic device 200 may be configured such that the enable signal may be directly sent to the corresponding functional block, thereby bypassing the SACs 230, 232, 234, 236.

In software-based power control schemes, the functional blocks 220, 222, 224, 226 cannot determine whether to enter a sleep mode or not, and hence have to rely on the control block 210 to issue sleep signals or similar signals to enter the sleep mode. This requires the control block 210 to execute power saving operations for the functional blocks 220, 222, 224, 226.

On the contrary, according to the disclosure, the SACs 230, 232, 234, 236 may monitor an activity state of the functional blocks 220, 222, 224, 226 and determine whether one or more of the functional blocks 220, 222, 224, 226 are to enter the sleep mode independently of the other functional blocks 220, 222, 224, 226, respectively. Thus, the control unit 210 may not need to determine whether the functional blocks 220, 222, 224, 226 need to enter the sleep mode or not, thereby reducing the processing burden of the control unit 210. Further, since the SACs 230, 232, 234, 236 are provided for the functional blocks 220, 222, 224, 226, respectively, it may be possible to individually turn on or off the functional blocks 220, 222, 224, 226, which is not possible with the software-based power saving operations.

Figure 7:
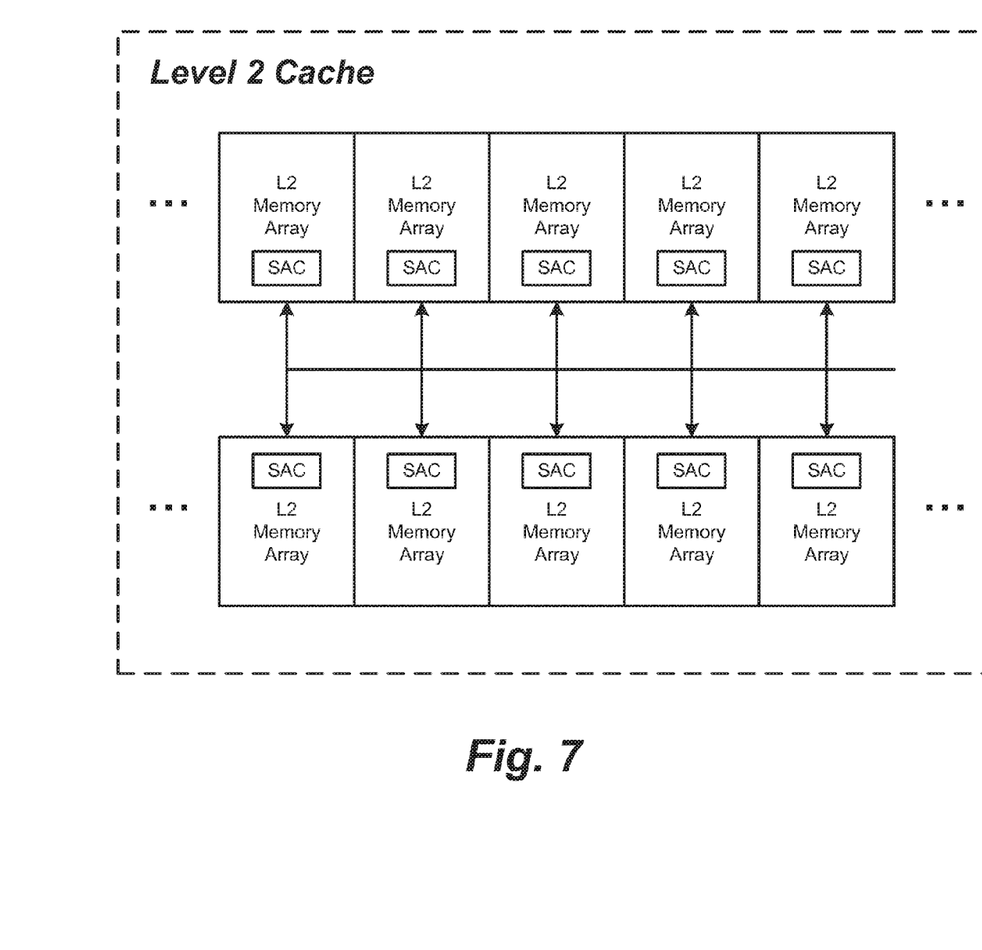
FIG. 7 shows a level 2 cache including SACs in accordance with an embodiment of the disclosure.

Since the functional blocks 220, 222, 224, 226 are individually controlled for power saving purposes, it may be possible to individually control the functional blocks 220, 222, 224, 226 for temperature control also. Each of the SAC 230, 232, 234, 236 may eventually allow the corresponding functional block to enter the sleep mode after the predetermined period of inactivity unless an enable signal is asserted or some other indication of activity is present. For example, as shown in FIG. 7, the SACs may be implemented in a level 2 (L2) cache of a microprocessor or the like to individually control memory arrays thereof. When the level 1 (L1) cache hit ratio is about ninety nine, the L2 cache may be accessed about once every 100 cycles. Considering that an application typically may access one array out of, e.g., thirty two arrays, in several thousands of cycles, when a SAC governs each of those arrays individually, it may possible to selectively energize a specific array that is needed and keep the other arrays in a leakage-free sleep state for extended periods. This may not be possible under the OS controlled sleep activation scheme because the OS may not have knowledge of an implementation or of the location of the required data in the cache. It is noted that a similar approach may be applied to other circuit arrays, such as adders, multiplexers, subtractors, dividers and the like.

Figure 2:
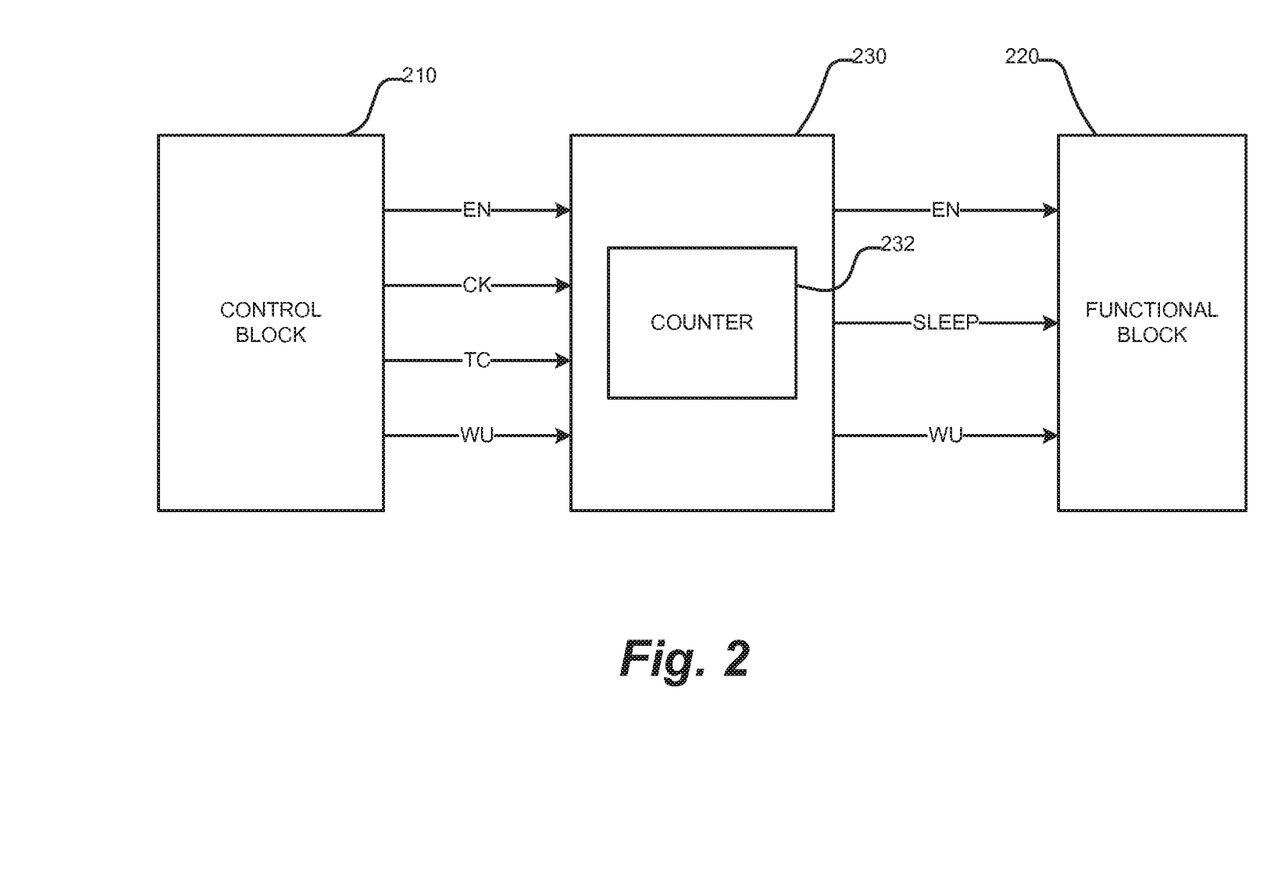
FIG. 2 shows an implementation of the control block, the functional block and the SAC shown in FIG. 1, constructed in accordance with an embodiment of the disclosure.

FIG. 2 shows an example of an implementation of the control block 210, the functional block 220 and the SAC 230 shown in FIG. 1, constructed according to an embodiment of the disclosure. The control block 210 may generate various signals including a clock signal CK and an enable signal EN. The clock signal CK may be used to provide a timing signal to the SAC 230. The enable signal EN may be the enable signal described above. The SAC 230 may receive the dock signal CK and the enable signal EN from the control block 210 and generate a sleep signal that may cause the functional block 220 to enter the sleep mode. The clock signal CK and the enable signal EN are known signals in electronic devices, and, hence, the SAC 230 may operate based on existing signals without needing to greatly modify the existing configuration to generate new signals. Other signals, or a logical state, may be monitored to ascertain an activity state of the functional block 220. For example, a wake up signal, which may be issued to awaken the functional block 220 if the functional block 22 in a sleep state, may be monitored by the SAC 230.

In an embodiment, the SAC 230 may include a counter 232, which may be configured to count a number of clock cycles during which the enable signal EN is not asserted. When the enable signal EN has not been asserted for a predetermined number of clock cycles, the counter 232 may issue the sleep signal to the functional block 220. The counter 232 may be reset when the enable signal EN is asserted. The SAC 230 may be configured to relay the enable signal EN to the functional block 220 with little or no delay to avoid activation delay of the functional block 220. Alternatively, the enable signal EN may be directly sent to the functional block 220 from the control block 210 to ensure no delay in activating the functional block 220.

The control block 210 may generate other signals that may be relevant to the operation of the SAC 230. For example, the control block 210 may generate a target count signal TC, which may contain information about a target count for the counter 232. The target count signal TC may be a static signal. For example, the target count signal TC may indicate that the target count is 100 clock cycles, and the SAC 230 may not generate a sleep signal until the counter 232 reaches 100 clock cycles while the enable signal EN is not asserted. The target count may be adjustable and programmable. For example, a user may program or adjust the target count by using an input device (e.g., a keyboard, a network port or the like) of the electronic device 200. Also, the electronic device 200 may offer a graphic user interface through a display screen (not shown) for entering the target counts for the functional block 220. Alternatively, when the target count for the functional block 220 is already determined and no adjustments are required, the target count information may be stored within the SAC 230 and the control block 210 may not need to generate the target count signal TC.

Further, the control block 210 may generate a wake up signal WU for instructing ting the functional block 220 to awaken if the functional block 220 is in the sleep mode. In some configurations, the wake up signal WU may be asserted every time the enable signal EN is asserted with a possible short delay therebetween. In that case, the wake up signal WU may be used by the SAC 230, instead of the enable signal EN, to reset the counter 232 and start counting the clock cycles. Thus, according to the disclosure, any signals that are indicative of activity of the functional block, or used to activate or wake up a functional block may be used for the power saving operations.

As mentioned above, it may be necessary to arrange the SAC within a functional block, and the functional block may have a limited space for the SAC. Thus, it may be desirable to implement the SAC with as small a form factor as possible. For example, the electronic device 200 shown in FIG. 1 may be a microchip, the functional block 220 may be one of the logic blocks of the microchip, and the SAC 230 may be implemented as a gate level logic within the logic block 220. For example, the size of the SAC implemented as a gate level logic may be about 400 μm². In order to minimize the size, in an embodiment, the SAC may use a counter, such as, e.g., an asynchronous counter, a ripple counter or the like, which may occupy less space than a synchronous counter while providing sufficient performance for the power saving operations according to the disclosure. However, any type of counter is contemplated in accordance with the disclosure.

Figure 3:
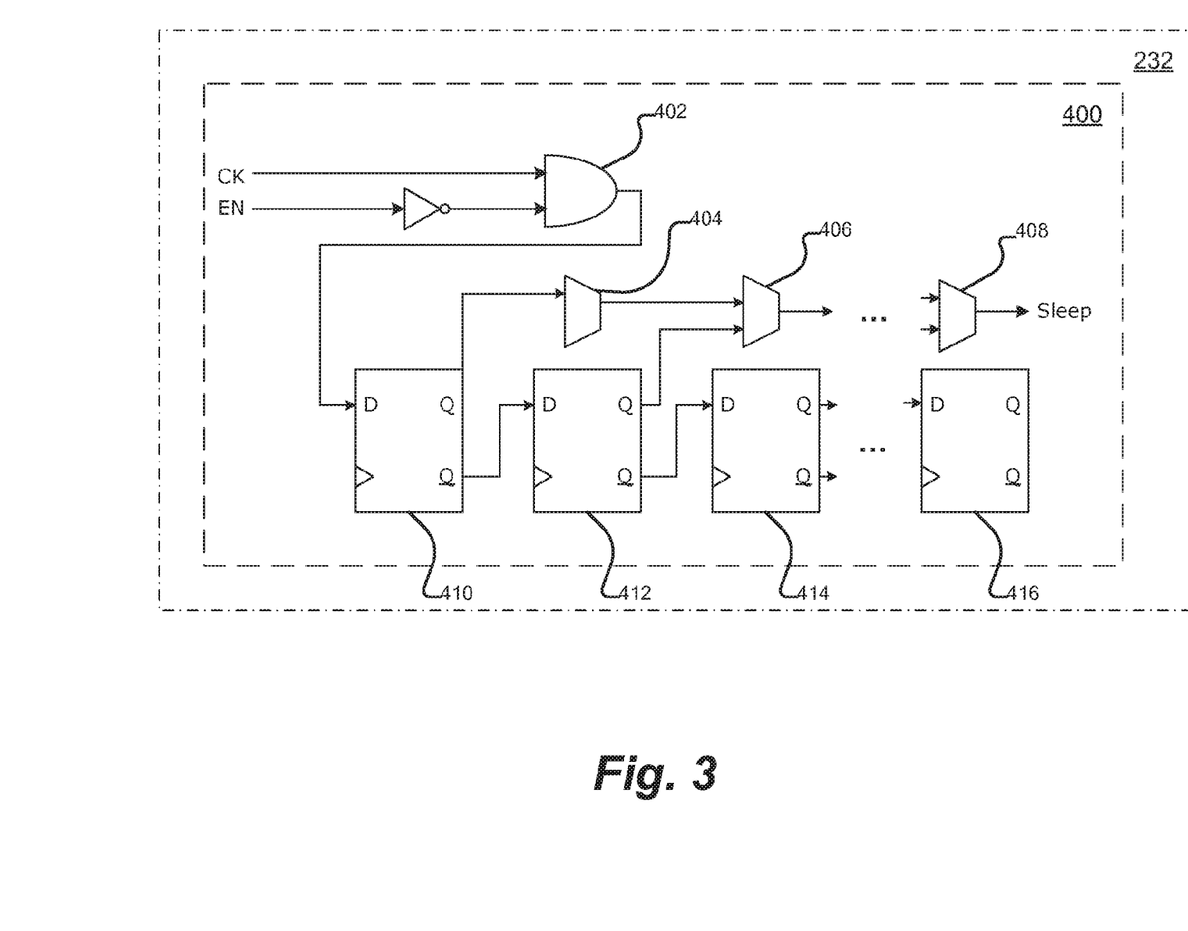
FIG. 3 shows a circuit diagram of a counter constructed in accordance with an embodiment of the disclosure.

FIG. 3 shows a circuit diagram of a suitable counter 400, which may be used as the counter 232 shown in FIG. 3, constructed according to teaching principles of the disclosure. The counter 400 may be configured as a ripple counter and use a dock at only the first (LSB) flop. All other flops may be docked by the previous stages, thereby minimizing power consumption. The asynchronous nature of the counter 400 may lessen any performance issue because activation of a sleep signal a cycle sooner or later may make little or no difference. Furthermore, possible programmable count targets may be limited to powers of two in order to minimize the number of control signals, save power and area. Possible values are 16, 32, 64, 128, 256, 512 and 1024. A control value of '000 (3 bits all zero) may indicate that the controlled circuit must not sleep at any time, when there is a need for such fine resolution.

As seen in FIG. 3, the counter 400 may receive the enable signal EN and the clock signal CK. The enable signal EN may be sampled when the clock signal CK rises. As described above, the enable signal EN rises, the counter 400 may be reset. Otherwise, the counter 400 may be incremented per each clock cycle or a predetermined number of clock cycles. The clock signal CK may clock the counter 400 unless the enable signal EN rises. Also, the clock signal CK may sample the enable signal EN into a flip flop 410 via an AND gate 402. Thereafter, a series of flip-flops 412, 414, 416 and a serious of multiplexers 404, 406, 408 (only three shown, but may include any number) provide the counting operation. Additionally, the counter 400 may receive the wake up signal WU and the target count signal TC. The wake up signal WU may be asynchronous and configured to be de-asserted when rising. The target count signal TC may be a DC vector. For example, the counter 400 may calculate the target count based on the following equation:

$$\text{Target Count} = 2 \times 2^{TC} + 1$$

In an embodiment, the maximum target count may be 257. The counter 400 may be configured to disable the SAC if the received target count signal TC is 000. The counter 400 may generate the sleep signal to instruct the corresponding functional block to enter the sleep mode.

Figure 4:
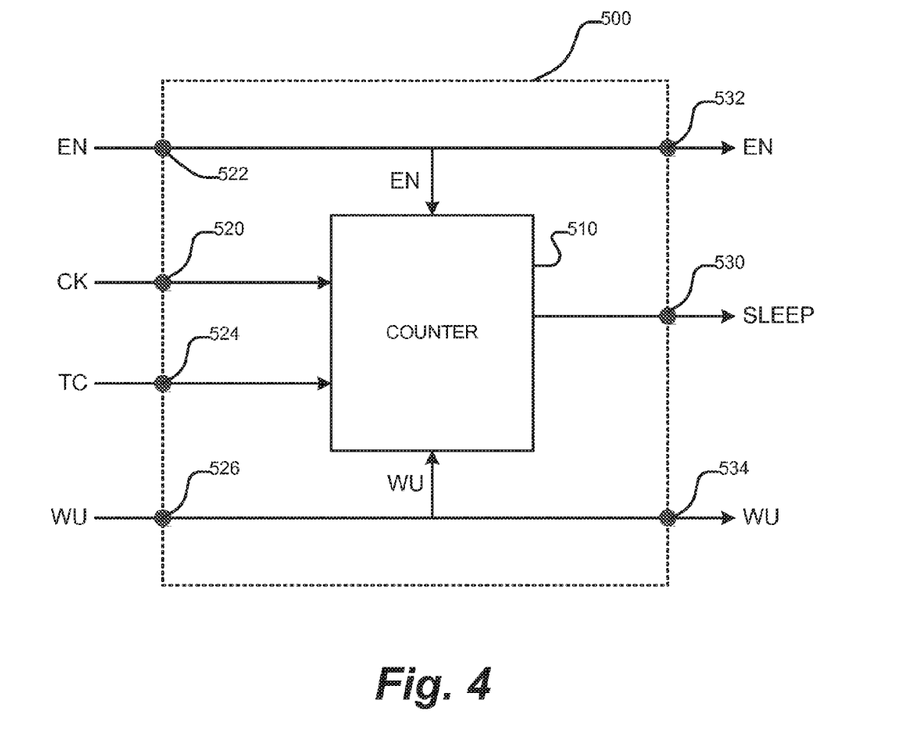
FIG. 4 shows a SAC configured in accordance with an embodiment of the disclosure.

FIG. 4 shows a configuration of a SAC 500, which may be used as the SAC 230, 232, 234, 236 shown in FIG. 1, constructed in accordance with an embodiment of the disclosure. As shown therein, the SAC 500 may include a counter 510, which may be the counter 400 shown in FIG. 3. The SAC 500 may further include a number of input terminals to receive the clock signal CK and other control signals and at least one output terminal to output the sleep signal. However, the SAC 500 may be configured with more input and output terminals if necessary. For example, the SAC 500 may include a clock terminal 520 and an enable input terminal 522 configured to receive the clock signal CK and the enable signal EN, respectively, from the control block 210 shown in FIG. 2.

The SAC 500 may further include a target count input terminal 524 and/or a wake up input terminal 526 to receive the target count signal TC and/or the wake up signal WU, from the control block 210. The SAC 500 may also include a sleep output terminal 530 to output the sleep signal. If necessary, the SAC 500 may further include an enable output terminal 532 and/or a wake up output terminal 534 to output the enable signal EN and/or the wake up signal WU, respectively. The wake up signal WU may be used, instead of the enable signal EN, in certain circumstances, for example, when the enable signal EN may not be available from the control block 210 or the control block 210 is configured to issue the wake up signal WU a number of cycles earlier than the enable signal EN is issued.

As mentioned above with reference to FIG. 3, the counter 510 may monitor whether the enable signal EN is asserted and increment the count per each clock cycle or predetermined number of clock cycles when the enable signal is not asserted. The counter 510 may not issue the sleep signal until the count reaches the target count. When the counting reaches the target count without the enable signal EN being asserted, the counter 510 will generate the sleep signal, which may be output to the corresponding functional block via the sleep output terminal 530. Since the sleep signal is not issued at least for a predetermined period of time (e.g., until the counter 510 reaches the target count), according to the disclosure, the corresponding functional block may not be turned off, thereby reducing power consumption caused by switching currents associated with a functional block entering and leaving sleep mode.

Figure 5:
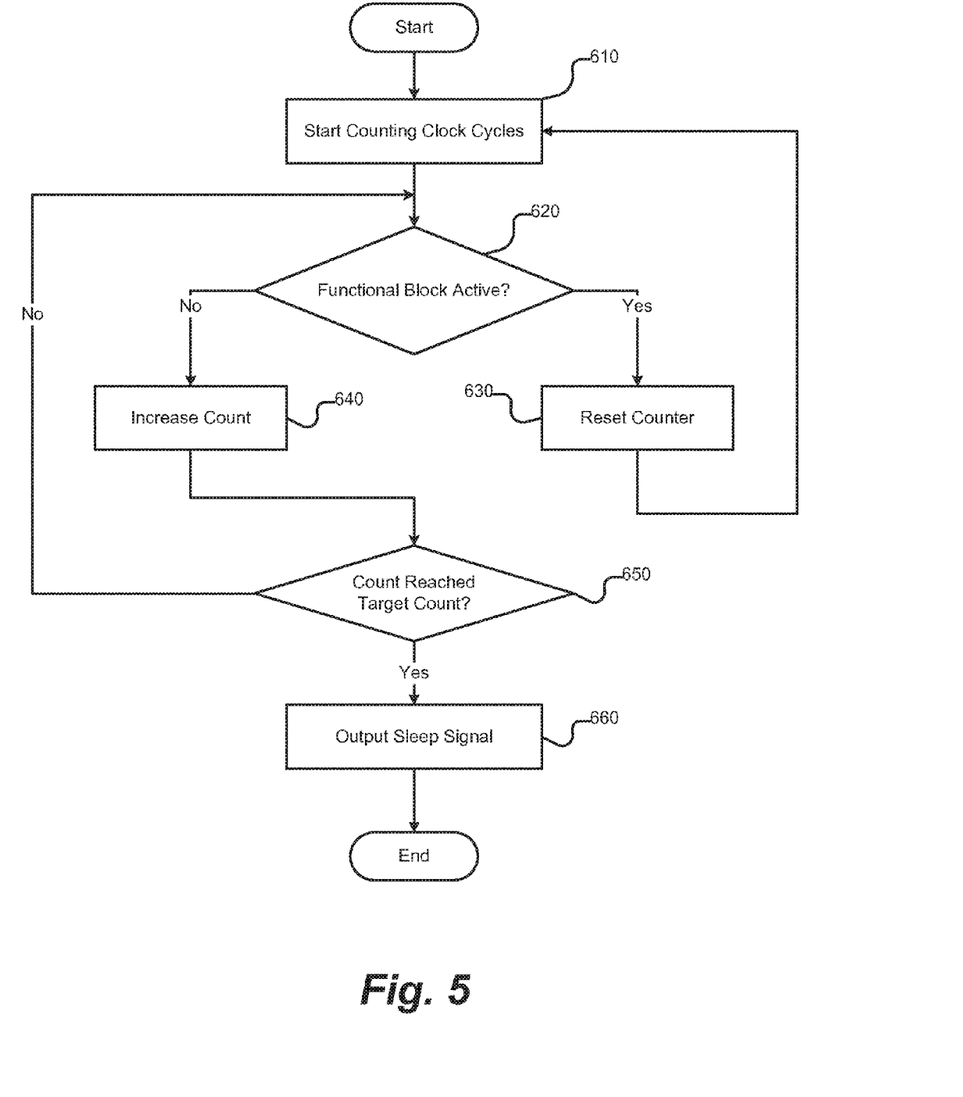
FIG. 5 shows a flow chart of a process for controlling a sleep mode for a functional block, in accordance with an embodiment of the disclosure.

FIG. 5 shows a flow chart of a process for controlling a sleep mode for a functional block, operating in accordance with an embodiment of the disclosure. Upon starting the process, a counting of clock cycles may begin at 610, which may be performed by, for example, the counter 232 of the SAC 230 provided for the functional block 220. Once the counting has started, the SAC 230 may determine an activity state of the functional block with which it is associated, for example, by determining whether the enable signal EN is asserted or not at 620. When the associated function block is active, the counter 232 may be reset at 630, and the process may move back to 610 in order to restart clock cycle counting. When the associated function block is not active at 620, the counter 232 may increment the count at 640, and the SAC 230 may determine whether the counter 232 has reached the target count at 650. When the counter 232 has not reached the target count, the process may loop back, at the next clock rising edge, to determine whether the associated functional block is active or not at 620. However, when the counter 232 reaches the target count, the SAC 230 may output the sleep signal to its corresponding functional block at 660 and the process may be completed. Thus, according to teaching principles of the disclosure, a functional block may be placed in a sleep mode following a predetermined period of inactivity.

Figure 6:
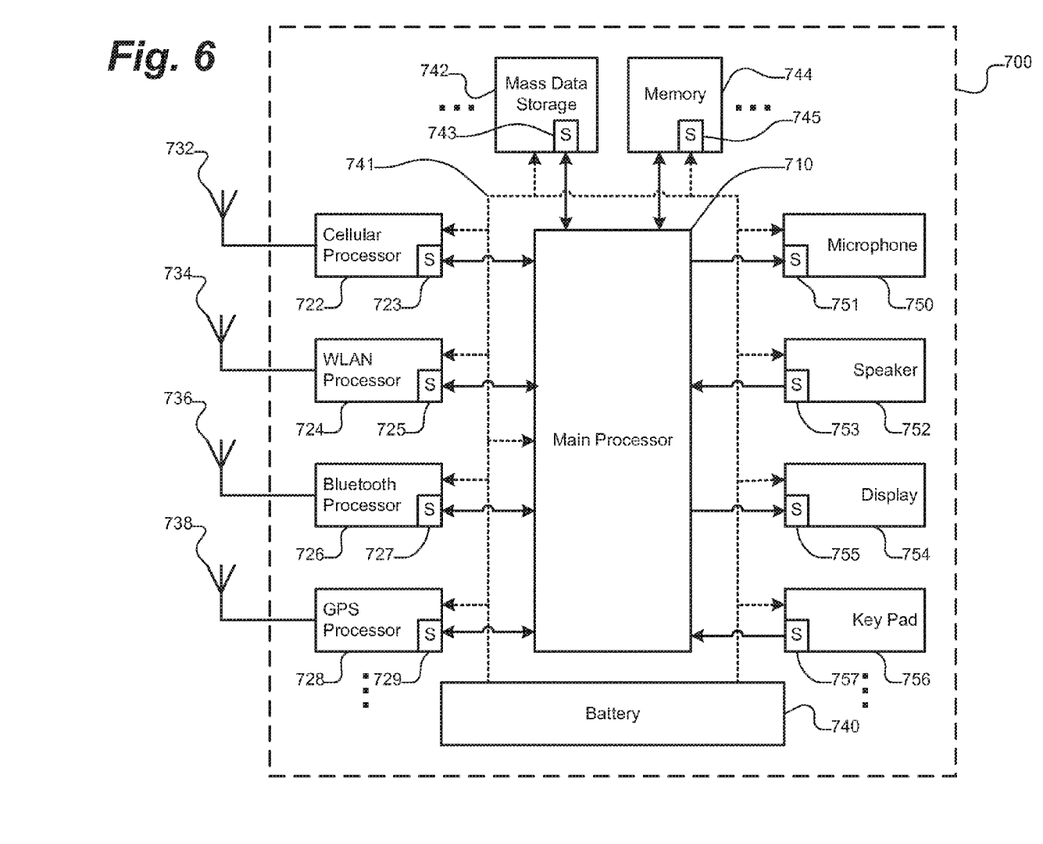
FIG. 6 shows a cellular phone including SACs in accordance with an embodiment of the disclosure.

FIG. 6 shows an implantation of the SAC in a cellular phone 700 in accordance with an embodiment of the disclosure, in which the SAC places a component (and not only a functional block) into a sleep mode. The cellular phone 700 may include a plurality of components, such as, for example, a main processor 710, one or more network processors (e.g., a cellular processor 722, a WLAN processor 724, a Bluetooth processor 726, a GPS processor 728, and the like), one or more antennas (e.g., a cellular antenna 732, a WLAN antenna 734, a Bluetooth antenna 736, a GPS antenna 738, and the like) connected to the respective network processors, a plurality of system devices (e.g., a battery 740, a power supply line 741, a mass data storage 742, memory 744), and one or more peripheral devices (e.g., a microphone 750, a speaker 752, a display 754, a key pad 756 and the like).

The power supply line 741, which is depicted as a dotted line in FIG. 6, may extend from the battery 741 to provide power to the main processor 710, the network processors 722, 724, 726, 728, the system devices 740, 742, and the peripheral devices 750, 752, 754, 756. The main processor 710 may be configured to control the network processors 722, 724, 726, 728, the system devices 740, 742, the peripheral devices 750, 752, 754, 756, and the like. More specifically, the main processor 710 may generate the clock signal CK, the enable signal EN, and the like, as described above.

For more precise and efficient power consumption control of the components, some or all of the functional components of the network processors 722, 724, 726, 728, the system devices 740, 742, and the peripheral devices 750, 752, 754, 756 may be provided with SACs 723, 725, 727, 729, 743, 745, 751, 753, 755, 757, respectively, which are shown as boxes labeled "S" in FIG. 6. Although shown in FIG. 6 at a component level, the SACs may be provided to the functional components at a very high resolution for circuit, memories, arrays and the like. Since the SAC may be provided for each of the functional components individually, it may be possible to turn on and off the functional components that are not needed, possibly without overburdening the main processor 710, thereby enabling more precise and efficient power consumption control and reduction of unnecessary heat generation.

In accordance with various embodiments of the disclosure, the methods described herein are intended for operation with dedicated hardware implementations including, but not limited to, semiconductors, application specific integrated circuits (ASIC), programmable logic arrays, and other hardware devices constructed to implement the methods and modules described herein. However, various embodiments of the disclosure described herein may be implemented for operation with as software programs running on a computer processor. Furthermore, alternative software implementations including, but not limited to, distributed processing or component/object distributed processing, parallel processing, virtual machine processing, any future enhancements, or any future protocol can also be used to implement the methods described herein.

While the disclosure has been described in terms of examples of the embodiments, those skilled in the art will recognize that the disclosure can be practiced with modifications in the spirit and scope of the appended claims. These examples given above are merely illustrative and are not meant to be an exhaustive list of all possible designs, embodiments, applications or modifications of the disclosure.

What is claimed is:

1. An integrated circuit, comprising:
a circuit comprising a central control circuit configured to transmit operation execution commands and a plurality of functional blocks configured to receive operation execution commands from the central control circuit, the plurality of functional blocks being distributed across the integrated circuit and being physically separate from the central control circuit, wherein ones of the plurality of distributed functional blocks comprise:
functional circuitry configured to execute received operation execution commands, the functional circuitry being in one of a first active state and a second state that is different from the first active state, wherein a wake up latency period corresponds to a transition time interval for changing from the second state to the first active state;
a sleep activation circuit associated with a corresponding functional block, the sleep activation circuit including:
a sensor configured to sense a state of activity of the corresponding functional block, the sensor monitoring a control signal from the central control circuit to the functional circuitry of the corresponding functional block, the control signal from the central control circuit to the corresponding functional circuitry of the functional block comprising an enable signal or a wake up signal that is received by the functional circuitry of the corresponding functional block, the wakeup signal being operative to activate the functional circuitry that is in the second state to be in the first activate state following the wake up latency period;

the sleep activation circuit being configured to determine an amount of time between detections of the enable signal or wake up signal from the central control circuit, the sleep activation circuit transmitting a sleep signal to the corresponding functional circuitry of the functional block to put the functional circuitry into the second state when the amount of time between detections of the enable signal or wake up signal from the central control circuit is greater than a predetermined threshold.

2. The integrated circuit of claim 1, wherein sleep activation circuits are physically arranged within ones of the distributed functional blocks.

3. The integrated circuit of claim 1, wherein the sleep activation circuit is configured to generate a sleep signal for the corresponding functional block.

4. The integrated circuit of claim 3, wherein the plurality of functional blocks comprises at least one of a processing block and a memory block.

5. The integrated circuit of claim 3, wherein the sensor further comprises a counter configured to count a number of clock cycles between detections of the control signal.

6. The integrated circuit of claim 5, wherein the counter is configured to generate the sleep signal when the counter reaches a target count.

7. The integrated circuit of claim 6, wherein the sleep activation circuit is configured to reset the counter when the corresponding functional block becomes active.

8. The integrated circuit of claim 6, wherein the sleep activation circuit further comprises an input terminal configured to receive the target count.

9. The integrated circuit of claim 8, wherein the input terminal of the sleep activation circuit is configured to receive a programmable target.

10. The integrated circuit of claim 8 configured to be used in at least one of a controller, a switch, a media storage and a cellular phone.

11. The integrated circuit of claim 5, wherein the counter is a ripple counter.

12. The integrated circuit of claim 1, wherein the sleep activation circuit further includes a timing circuit for counting the amount of time between detections of the control signal.

13. The integrated circuit of claim 12, wherein the timing circuit includes a ripple counter comprising a plurality of serially arranged flip flops and a plurality of serially arranged multiplexers, wherein the ripple counter includes inputs configured to receive a clock signal and the control signal; and wherein the clock signal is used at only the first of the serially arranged flip flops and a remainder of the serially arranged flip flops are clocked by previous stages.

14. The integrated circuit of claim 13, wherein the count of the amount of time between detections of the control signal is reset to zero when the control signal rises; and wherein the count of the amount of time between detections of the control signal is incremented at each clock signal or at a predetermined number of clock signals when the control signal has not risen.

15. The integrated circuit of claim 13, wherein the input configured to receive the control signal is sampled when the input configured to receive the clock signal rises;

wherein the control signal is sampled into the first of the serially arranged flip flops via an AND gate; and wherein a remainder of the serially arranged flip flops and the serially arranged multiplexers perform the counting of the amount of time between detections of the control signal.

16. The integrated circuit of claim 1, wherein the control signal from the central control circuit to the corresponding functional block comprises an enable signal that is asserted when the corresponding functional block is active, wherein the sleep activation circuit is configured to transmit the sleep signal to the corresponding functional block when the amount of time between detections of the enable signal exceeds the predetermined threshold.

17. The integrated circuit of claim 1, wherein the sleep activation circuit further includes a timing circuit for counting the amount of time between detections of the control signal;

wherein the timing circuit includes a ripple counter comprising a plurality of serially arranged memory units and a plurality of serially arranged multiplexers;

wherein an input of the ripple counter is configured to receive the control signal and is sampled based on a clock signal;

wherein the control signal is sampled into a first of the memory units via an AND gate; and wherein a remainder of the serially arranged memory units and the serially arranged multiplexers perform the counting of the amount of time between detections of the control signal.

18. The integrated circuit of claim 1, wherein the second state comprises a sleep state.

19. A method of controlling a sleep mode in one of a plurality a functional blocks of a circuit, each functional block including functional circuitry configured to execute received operation execution commands, comprising:

sensing an activity state of a first functional block by monitoring a control signal from a central control circuit that is configured to transmit operation execution commands to the functional circuitry of the first functional block and to functional circuitry of other functional blocks that are distributed across the circuit, the other functional blocks being physically separate from the central control circuit, wherein the control signal from the central control circuit to the functional circuitry of the first functional block comprises an enable signal or a wake up signal, the functional circuitry of the first functional block being in one of a first active state and a second state that is different from the first active state, wherein a wake up latency period corresponds to a transition time interval for changing from the second state to the first active state;

using a sleep activation circuit disposed at the first functional block to determine an amount of time between detections of the enable signal or wake up signal from the central control circuit to the functional circuitry of the first functional block that is received by the functional circuitry of the corresponding functional block, the wake up signal being operative to activate the functional circuitry that is in the second state to be in the first active state following the wake up latency period;

transmitting a sleep signal from the sleep activation circuit to the functional circuitry of the first functional block to put the functional circuitry of the first functional block into the second state when the amount of time between detections of the enable signal or wake up signal from the central control circuit is greater than a predetermined threshold.

20. The method of claim 19, wherein sensing the state of the first functional block comprises monitoring whether an enable signal from the central control circuit for activating the first functional block is asserted.

21. The method of claim 19, further comprising restarting the amount of time when the enable signal is sensed.

* * * * *